(12) United States Patent
Sipe

(10) Patent No.: US 7,429,398 B1
(45) Date of Patent: Sep. 30, 2008

(54) **METHOD OF PRESERVING LIVE *CERATOMIA CATALPAE* LARVAE FOR USE AS FISHING BAIT**

(76) Inventor: William Andrew Sipe, 1922 Campbell Rd., Newton, NC (US) 28658

( * ) Notice: Subject to any disclaimer, the term of this patent is extended or adjusted under 35 U.S.C. 154(b) by 1198 days.

(21) Appl. No.: 10/648,013

(22) Filed: Aug. 26, 2003

(51) Int. Cl.
*A01K 97/04* (2006.01)

(52) U.S. Cl. .............................. 426/1; 426/520; 426/524

(58) Field of Classification Search ...................... 426/1, 426/520, 524
See application file for complete search history.

(56) References Cited

U.S. PATENT DOCUMENTS

| | | | |
|---|---|---|---|
| 3,719,496 A * | 3/1973 | Chen et al. ................... | 426/385 |
| 4,155,331 A | 5/1979 | Lawrence et al. | |
| 4,160,847 A | 7/1979 | Orth, Jr. | |
| 4,161,158 A | 7/1979 | Kartesz | |
| 4,503,077 A | 3/1985 | Horton | |
| 4,788,072 A * | 11/1988 | Kawamura ................... | 426/441 |
| 5,173,316 A | 12/1992 | Heycott | |
| 5,227,183 A * | 7/1993 | Aung et al. ................... | 426/102 |
| 5,776,523 A | 7/1998 | Axelrod | |
| 6,020,013 A | 2/2000 | Kozma | |
| 6,284,298 B1 | 9/2001 | Montgomery | |

OTHER PUBLICATIONS

Coder, Kim D., The University of Geogia. Dec. 1999, Southern Catalpa: The Fish Bait Tree:, http://www.forestry.uga.edu/warnell/service/library/index.php3?docID=178&docHistory☐=2.

Baaerg, W.J., 1935, "Three shade tree insects, II Great Elm Leaf Beetle, Catalpa Sphinx and Eastern Tent Caterpillar" University of Arkansas Agricultural Experiment Station Bulletin No. 317.

Howard L.O., Chittenden, F.H., 1916, "The Catalpa Sphinx", Unitted States Department of Agriculture Farmers Bulletin, Bulletin 705, Feb. 16, 1916.

Hyche, L.L., 1994, "The Catalpa Sphinx", Alabama Agricultural Experiment STation, Auburn University, Leaflet 106, Mar. 1994.

Nayar J.K., Fraenkel G. 1963 The Chemical Basis of the Host Selection in the Catalpa Sphinx, *Ceratomia catalpae* (Lepidoptera, Sphingindae). Annals of the Entomological Society of America, vol. 5, pp. 119-122.

Ness, J.H., "Catalpa bignonioides alters extrafloral nectar production after herbivory and attracts ant bodyguards" Published online Nov. 22, 2002.

* cited by examiner

*Primary Examiner*—C. Sayala
(74) *Attorney, Agent, or Firm*—Robert W. Pitts

(57) ABSTRACT

This invention is a method of preserving without any chemical additives *Ceratomia catalpae* larvae (Catalpa worms) for use as fish bait by cleansing, blanching, and subsequently freezing them in sealed, moisture and vapor limiting bags. The larvae is first chilled as to limit mobility, then picked clean and rinsed with water. The larva is then blanched in boiling water, immersed in cold water to limit cooking and dried. With the use of sterilized tongs, the larvae is then placed in individual plastic bags and frozen within another bag to limit freezer burn. The individual bags of Catawba worms can be thawed out and the worms fished within months after they are harvested with minimal deterioration.

20 Claims, 13 Drawing Sheets
(3 of 13 Drawing Sheet(s) Filed in Color)

METHOD OF PRESERVING LIVE *CERATOMIA CATALPAE* LARVAE FOR USE AS FISHING BAIT

BACKGROUND OF THE INVENTION

1. Field of the Invention

This invention relates to fish bait, and more particularly the preservation of *Ceratomia catalpae* (order Lepidoptera, Family Sphingidae) sometimes referred to as "Catalpa or Catawba worm" larvae through the cleansing, blanching, and freezing of the larvae in individual bags and successively larger bags. This finished frozen fish bait does not contain any chemical preservatives, and can be kept frozen with limited deterioration for months.

2. Description of the Prior Art

Information on the *Ceratomia catalpae*, commonly referred to as the Catalpa or Catawaba worm can be found in the following publications.

Coder, Kim D. Professor, The University of Georgia. December 1999. "Southern Catalpa: The Fish Bait Tree". Retrieved on Jul. 8, 2003 from: http://www.forestry.uga.edu/warnell/service/library/index.php3?docID=178&docHistory[ ]=2

Baerg, W. J. 1935. "Three shade tree insects, II Great Elm Leaf Beetle, Catalpa Sphinx, and Eastern Tent Caterpillar". University of Arkansas Agricultural Experiment Station Bulletin No. 317. 28 pages.

Howard L. O., Chittenden, F. H., 1916. "The Catalpa Sphinx". United States Department of Agriculture Farmers Bulletin. Bulletin 705, Feb. 16, 1916.

Hyche, L. L. 1994. "The Catalpa Sphinx". Alabama Agricultural Experiment Station, Auburn University Alabama. Leaflet 106. March 1994

Nayar J. K., Fraenkel G. 1963. "The Chemical Basis of the Host Selection in the Catalpa Sphinx, *Ceratomia catalpae* (Lepidoptera, Sphingidae). *Annals of the Entomological Society of America. Vol* 5. pages 119-122.

Catawba or Catalpa caterpillars are notoriously prized fishing bait, used for catching most species of freshwater fish in the United States. The caterpillars are highly regarded by fishermen, and references to their harvesting for fishing bait has been recorded back to the 1870's.

Catawba or Catalpa caterpillars are the larval stage of the Catalpa Sphinx moth (*Ceratomia catalpae*, Order Lepidoptera, Family Sphingidae) and sometimes referred by fishermen as "Catawba worms" or "Catalpa worms". The catalpa sphinx moth is found in much of the Eastern US from Florida to New York, west to Michigan, Iowa, and Kansas and Texas. The larvae is a monophagous insect that feed exclusively on the leaves of the deciduous *Catalpa speciosa, Catalpa bignonioides, Catalpa ovata* (also known as *Catalpa kaempferi*) and *Catalpa bungei* trees. Catalpa trees may be defoliated completely by the Catalpa caterpillars and kept bare the entire growing season so that the trees are badly damaged or even killed. Thus, loss of foliage by the larvae is especial serious concern for shade and ornamental trees as well as nursery stock.

The Catalpa Sphinx moth has four distinct life stages: adult, pupa, larva, and egg. The adult stage is a large, gray, nocturnal moth with a wing span of approximately 65-70 mm when extended. After mating the moths, lay between 1-1000 small, whitish, greenish eggs on the underside of Catalpa tree leaves. The eggs hatch into larva, and begin to "skeletonize" the Catalpa trees. The larval stage is the longest stage (approximately 16 days) in which the caterpillars molt 4-5 times, and as they continue to eat the Catalpa foliage and grow. Full grown larva are approximately 3-4 inches long, and marked with a black band with a white line running along the side of the band, and a distinctive "horn" on their backs. The sides of the larvae are usually pale yellow. However, there are various colors and shades that have been noted in Catalpa larvae. The approximate time frame for the adult, egg, and larval stages is 21-25 days. The final stage of the Catalpa Sphinx Moth is the pupation stage. After the larvae have become adults (approximately 3-4 inches long), they fall or drop from the Catalpa tree and enter the soil. After entering the soil, they begin the pupation stage. The pupa is usually reddish in color, and about 30-40 mm long. Excluding winter moths, the pupas usually reemerge with two weeks as moths. The entire life cycle of the Catalpa Sphinx Moth, from pupa to pupa is approximately 30-40 days depending on environmental factors, and climate.

In addition to the complexity of maintaining a plantation of Catalpa trees sufficient to provide the exclusive foliage for the Catalpa larvae to eat and the complex life cycle of the moth, commercially rearing the Catalpa caterpillars also has another barrier, natural predators. The Catalpa larvae are attacked by parasites and by a small wasp. The wasp, *Apanteles congregatus* is a small winged, wasp-like insect that stings and lays its eggs in the Catalpa larvae. The larvae develops and feeds on the caterpillar, and when ready for transformation (back into a wasp) eats a hole through the skin of the caterpillar and spins a white cocoon on the outside of the "Catalpa worms". Once stung, Catalpa larvae are commercially useless (for fishing bait) and dies before adulthood. Another predator of the "Catawba worm" are the Tachina Flies, which commonly attack the larvae. In one reported example of a Catalpa worm egg mass that originally contained 807 eggs, due to parasitism only 4 caterpillars survived. It has also been our experience that the pupae stage of the "Catawba worm" is also vulnerable to predation. Once the larvae begin pupation in the soil, they are susceptible to raccoons, skunks and other animals looking for food and are "dug out" of the soil and eaten. It has also been our experience that common Toads and Frogs eat smaller Catalpa larvae during the night, if they happen to fall off the trees, and that other insects such as the common yellow jacket and all species of ants found in the Catawba County, N.C. region actively pursue and kill the young larvae.

Once the aforementioned factors have been overcome, and a supply of "Catawba worms" is readily available, getting the product to the end consumer remains a major problem. Harvesting Catawba worms is difficult at best. It has been our experience, that most fishermen prefer the adult larvae as fishing bait. Thus, the majority of the caterpillars harvested are approximately 3-4 inches long, and approximately ½ wide. Since the larva exclusively eats the leaves of specific species of Catalpa trees, the larvae must be picked from the trees. This has to be done with minimal handling to the caterpillars as possible as, if the larva is dropped or agitated they "spit" at their aggressor loosing part of their digested leaves, which leads to deterioration in the quality of the larva (to fishermen). Also, if disturbed the larva has a tendency to "defensively" squirm or swing their heads to fend off what is attacking them. If this happens once the larvae is harvest and placed in the bucket, they can damage other worms in the same bucket. This in turn, makes them less appealing to the end consumer, the fisherman.

Once the Catawba worms are harvested they have to be delivered to the retail outlets. It has been our experience that live Catawba worms only last 5-10 days once they have been harvested, packaged and refrigerated. After approximately 10 days or less in the refrigerator, the live caterpillars or worms become generally worthless to fisherman. The Catawba worms turn yellow-blackish, dry out, develop mold and become excessively tainted with frass from other worms surrounding them. Thus, to most Bait and Tackle stores who sell fish bait, the shelf life of live Catawba worms would only be approximately 5-7 days. FIG. 13 is a color photograph of live Catalpa or Catawba worms that have been refrigerated for 10 days. Comparison with the color photograph of FIG. 11 shows the deterioration of the live Catalpa or Catawba worms during this period.

Therein lies the problem, how can a Catawba worm be supplied to fishermen when the crop is seasonal, when it grows exclusively on certain species of trees, that are susceptible to parasites, difficult to harvest and rear, and only has a "fishable" shelf life in the refrigerator of 5-10 days. Traditional methods of preserving Catawba worms to make them available year round were to place the caterpillars in sawdust, cornmeal, flour, and pint jars of water and then freezing them. My first preserved bait was a Catalpa worm frozen in Corn Meal. However, the shelf life of these baits was only a few weeks. After that, the caterpillars turned yellow-blackish, suffered from freezer burn, and when thawed out became brittle (skin) and soggy. FIG. 12 shows an example of Catalpa or Catawba worms frozen by this prior art method. To most fishermen, this product was unacceptable. My next step was to try food grade preservatives, rubbing alcohol, and other common preservatives used in fish bait. However, I have found the natural colorations, scent, and texture of the bait to be less fishable and attractive to both the consumers and the targeted fish (through fishing with the worms). Also, that some common preservatives used in fishing bait were really not what you wanted to ingest yourself or feed to your family, if you used a typically preserved bait to catch a fish, and in turn ate that fish.

U.S. Pat. No. 5,776,523 entitled "Method for preserving baits", discloses an example of a method of preserving fish bait by immersing the bait in a solution of formalin to prevent decay by bacterial action, then rinsing the bait with running water, and placing the bait in a container of a second aqueous solution of grain alcohol. According to the Occupational Safety and Health Administration (OSHA), the term "formalin" is the aqueous solution, particularly those containing 37-50% formaldehyde and a 6 to 15% alcohol stabilizer (OSHA Fact Sheet on Formaldehyde). It is also noted in that fact sheet that "Formaldehyde" is a "suspected human carcinogenic that is linked to nasal cancer and lung cancer". In addition, in the publication "Medical Management Guidelines for Formaldehyde" published by the Agency for Toxic Substances and Disease Registry (an agency of the Department of Health and Human Services) states that "Ingestion of aqueous solutions of formaldehyde can result in severe corrosive injury to the esophagus and stomach" and that "formaldehyde may reasonably anticipated to be a carcinogen".

As realized in other means of preserving fish bait in prior art, successfully preserving products for a long period of time was difficult and certain chemical preservatives were usually added to maintain the shelf life of the product. Also, that preservation of Catalpa worms had generally not been documented. For example, U.S. Pat. No. 4,161,158 entitled "Preservation of Live Fish Bait" a method of preserving live underground and surface dwelling fishing bait is shown. This method involves sterilizing the fish bait in a solution of 10-15% (by weight) ethanol for 10-15 seconds, packing the bait in a media containing nutrients, an antibiotic (penicillin) then a stress relief (cortisone), and finally keeping at a temperature between 34-55 degrees Fahrenheit.

In U.S. Pat. No. 4,503,077 entitled "Method for Preserving Fishing Bait" there is disclosed a method for preserving bait by cleaning the bait, pre-cooling the organisms, freezing the bait, condensing, evacuating and heating the bait to remove water, and then separating and packaging the bait.

In U.S. Pat. No. 4,160,847 entitled "Process of Improving the Freeze-Thaw Stability of Fish Bait", the method to improve freeze-thaw stability of fish bait by impregnating fish such as herring in a vacuum with a water soluble, non-toxic glycol then draining and freezing the bait.

Although not directly concerned with the problem of preserving fishing baits, U.S. Pat. No. 6,020,013 entitled "Method of preventing freezer burn on food in storage bags", discloses a method of preventing freezer burn on frozen foods by providing a triple seal to prevent the ingress of ambient air through the seals into the interior of the storage bags.

SUMMARY OF THE INVENTION

After unsuccessfully trying to preserve Catawba worms and noting the severity of some preservatives used to preserve fish bait, and the importance of limiting freezer burn in prior art, a new process of cleansing, blanching, drying, bagging and freezing the caterpillars has been developed. This process had advantages over the previous unsuccessful art in that, it had no harsh chemical additives, had extended shelf life, and retained most of the characteristics of fresh Catawba worms, such as tough skin, color, and scent after they were thawed out.

According, it is an object of this invention to provide a new method of preserving Catalpa worms (fish bait) that will allow the product to have extended shelf life and appeal, which includes the steps of cleaning the worms, blanching, drying and subsequently freezing them in sealed bags.

Another object of this invention is to provide a fish bait product that is free of any chemical preservatives that still maintains the qualities of fresh worms.

These objects have been achieved by a method of preserving harvested *Ceratomia catalpae* larvae for periods exceeding the larvae stage of *Ceratomia catalpae* for use as fishing bait. This method includes several steps. A batch of live *Ceratomia catalpae* larvae is harvested from Catalpa trees and cleaned remove contaminants, including frass excreted by the *Ceratomia catalpae* larvae. The live *Ceratomia catalpae* larvae are then introduced into heated water to blanch the batch of *Ceratomia catalpae* larvae for a period longer that the time required to kill the *Ceratomia catalpae* larvae. This batch of *Ceratomia catalpae* larvae is then cooled to stop cooking due to blanching the batch of *Ceratomia catalpae* larvae. The batch of *Ceratomia catalpae* larvae is then dried and frozen. Additional steps, such as refrigerating the larvae after harvesting and before processing to limit physical activity can also be employed. The *Ceratomia catalpae* larvae can be packed in plastic bags for freezing and a number of plastic bags can be placed in an outer bag to limit freezer burn.

The product produced by this process is a package of fresh water fishing bait including a container, such as a plastic bag, substantially impervious to oxygen, and frozen *Ceratomia catalpae* larvae enclosed in the container. The frozen Ceratomia catalpae larvae exhibits substantially the same coloring as live *Ceratomia catalpae* larvae and exhibits the scent of live *Ceratomia catalpae* larvae, when thawed, and has skin exhibiting substantially the same toughness as the skin of live *Ceratomia catalpae* larvae. The frozen *Ceratomia catalpae* larvae exhibits an absence of moisture not present in live *Ceratomia catalpae* larvae and an absence of chemical preservatives.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 1 shows harvested Catalpa larvae placed in refrigerator at approximately 50-55 degrees for 2 hours to limit physical activity. This is done so that processing and handling of the larvae can be done without them moving around. Harvested caterpillars are approximately 3-4 inches long and ½ inch wide. Note where the larvae have "spit" on the sides of the 5 gallon bucket after becoming agitated.

FIG. 2 shows Catalpa larvae or worms immersed in water, so that the frass and some of the sticks will fall to the bottom of the bucket. Half eaten leaves, sticks and trash must also be separated from the Catalpa larvae.

FIG. 3 shows the frass, sticks, and trash left over after all larvae have been removed. The black material at the bottom of the bucket is frass.

FIG. 4 is a photograph showing Catalpa Larvae being rinsed in sink, as to remove any frass, or other materials still on them.

FIG. 5 is a photograph showing Catalpa Larvae prior to blanch bath.

FIG. 6 is a photograph of Catalpa Larvae in blanch bath for the first 3 seconds.

FIG. 7 is a photograph showing the Catalpa Larvae in a blanch bath after 5-10 seconds. Notice how the worms have straightened out.

FIG. 8 is a photograph showing the Catalpa Larvae in ice water bath for approximately 15-20 seconds.

FIG. 9 is a photograph showing the Catalpa Larvae being dried. Hand blotting and drying at an elevated temperature can both be employed in the preferred embodiment of this process.

FIG. 10 is a photograph showing Catalpa Larvae being packaged in individual bags, such as Poly/Vinyl/Nylon (3 mil.) vacuum sealer bags, with a plurality of individual bags being placed in larger freezer bags, to limit freezer burn.

DESCRIPTION OF THE PREFERRED EMBODIMENT

To clarify, the following is an example of a process according to this invention for preserving *Ceratomia catalpae* larvae, without preservatives, so that the frozen Catalpa or Catawba worms are suitable for use a fishing bait, which retains significant characteristics of the live Catalpa or Catawba worm. The entire process takes approximately 3½-5 hours, with the harvesting and cooling taking 3-4 hours and the processing taking 30-40 minutes.

In the example of this invention illustrated in the photographs of FIGS. 1-10, adult 3-4 inch Catalpa larvae were harvested 10:00 AM. Approximate 200-250 caterpillars were "picked" and put into 3 gallon pails. The harvesting process takes approximately 1-2 hours. Since the caterpillars eat the leaves of deciduous trees (Catalpa) the harvesting usually happens in the late spring to early fall in the Piedmont of North Carolina (May-August). As with any picking or farming the harvesting is labor intensive and done in a field of trees. Thus, along with the leaves, frass, and other "trash" other items such as dirt, sweat, insects (predators) common grass accumulates in the buckets that need to be cleaned out prior to processing.

Figure 1:
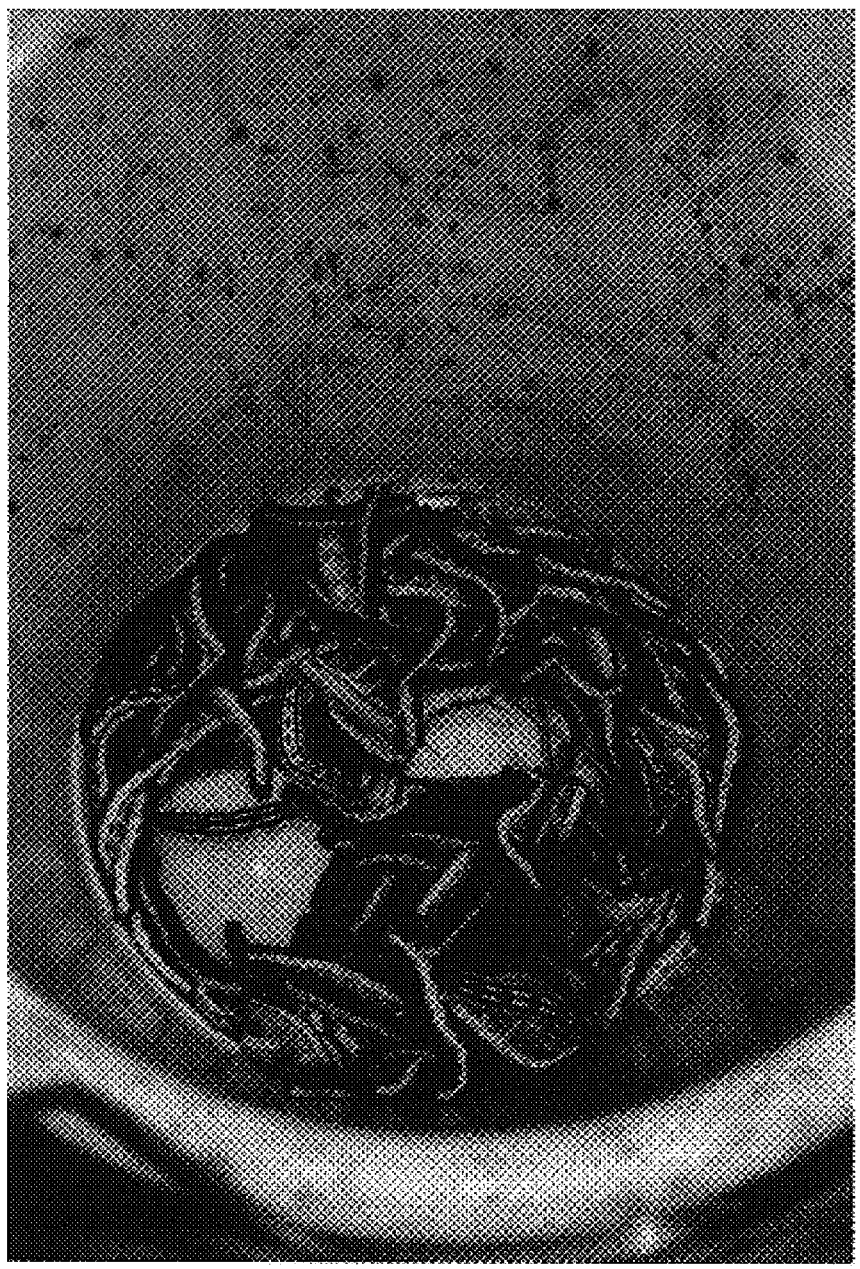
FIGS. 1-10 are photographs showing significant stages of the process for preserving *Ceratomia catalpae* larvae (Catalpa or Catawba worms) for use as fishing bait.
Figure 2:
Figure 3:
Figure 4:

The larvae were then placed in a refrigerator at approximately 12:00 PM, at 50-55 degrees Fahrenheit and kept there until 2:00 PM. This is important step because; if the larvae are not allowed to cool they instinctively crawl in search of food. Whereas, if they are cooled they become somewhat "dormant" and easier to process and handle. This step facilitates performance of subsequent steps because the Catalpa or Catawba worms can be handled and processed without the larvae moving around excessively. The harvested larvae are in the larval, adult phase (within days of pupation) of the life cycle, and are 2½ inches to 4 inches long and approximately ½ inch wide ($4^{th}$ or $5^{th}$ instar larvae). The cooled larvae were then taken out of the refrigerator, and placed under a faucet where approximately ½ gallon of water is run over the top of the larvae, or depending on the size of the bucket enough water to "float" the larvae, as shown in FIG. 2. This step allows some of the "trash" and frass collected in the harvesting process to separate from the worms and fall to the bottom of the bucket, and initially cleans the caterpillars. Frass is excreted by the Catalpa or Catawba worms, especially when agitated during harvesting and handling. The dark mass shown in the photograph of FIG. 3 is frass, submerged in water. This step takes approximately 2-4 minutes, and is followed by hand separating the balance of the larvae from any remaining trash in the bucket. Depending on the cleanliness of the caterpillars, this takes 5-15 minutes. It has been noted, that any frass, leaves, sticks and other trash left surrounding the larvae adds to the bacteria, dirt, and mold in the finished product. This can in turn degrade the appearance and overall appeal to the end customer and reduce the shelf-life of the frozen caterpillars.

After the larvae is picked clean, they are placed in a "holding" sink. This allows preparation of individual batches of larvae to be processed, cleanse the larvae a final time, and keeps them in a central location. Once the larvae have been introduced to the washing steps they appear to "wake up" and begin to search for food, and begin to excrete frass again. Thus, having them in a central location where they cannot escape, and cleaning any newly accumulated frass off is important. The final cleansing step usually takes 5-10 minutes.

Figure 5:
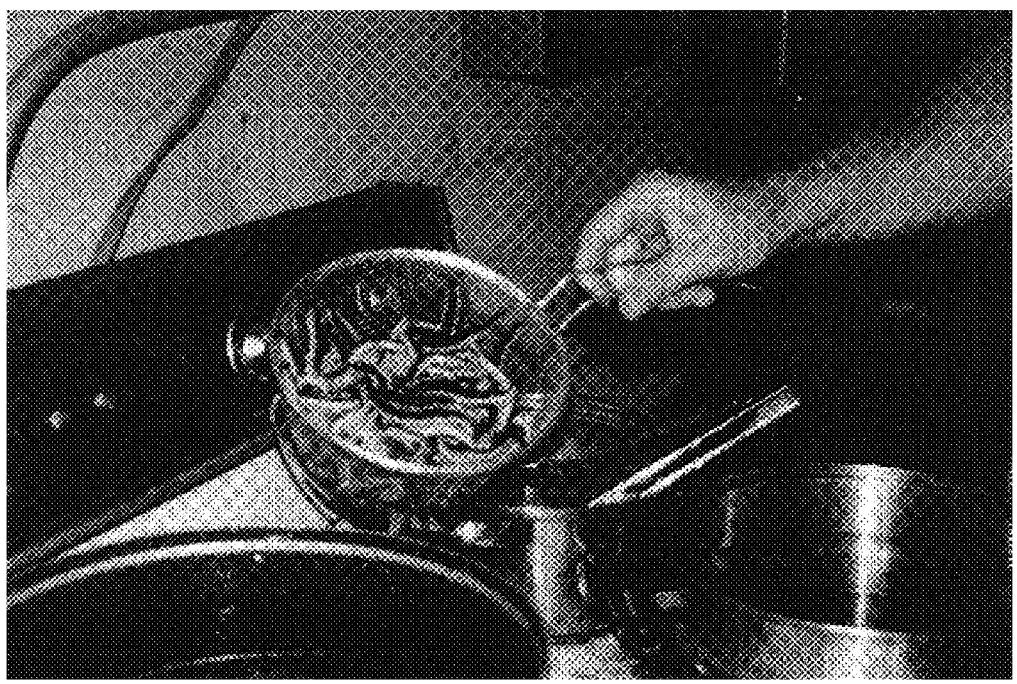

After the larvae are cleaned a final time, they are prepared in 100-120 caterpillar batches and placed in a strainer as shown in FIG. 5. Putting the larvae in batches allows us to limit the amount of time the larvae are exposed to bacteria and microorganisms after they have completed the cleaning process. This step takes approximately 1 minute per batch.

Figure 6:
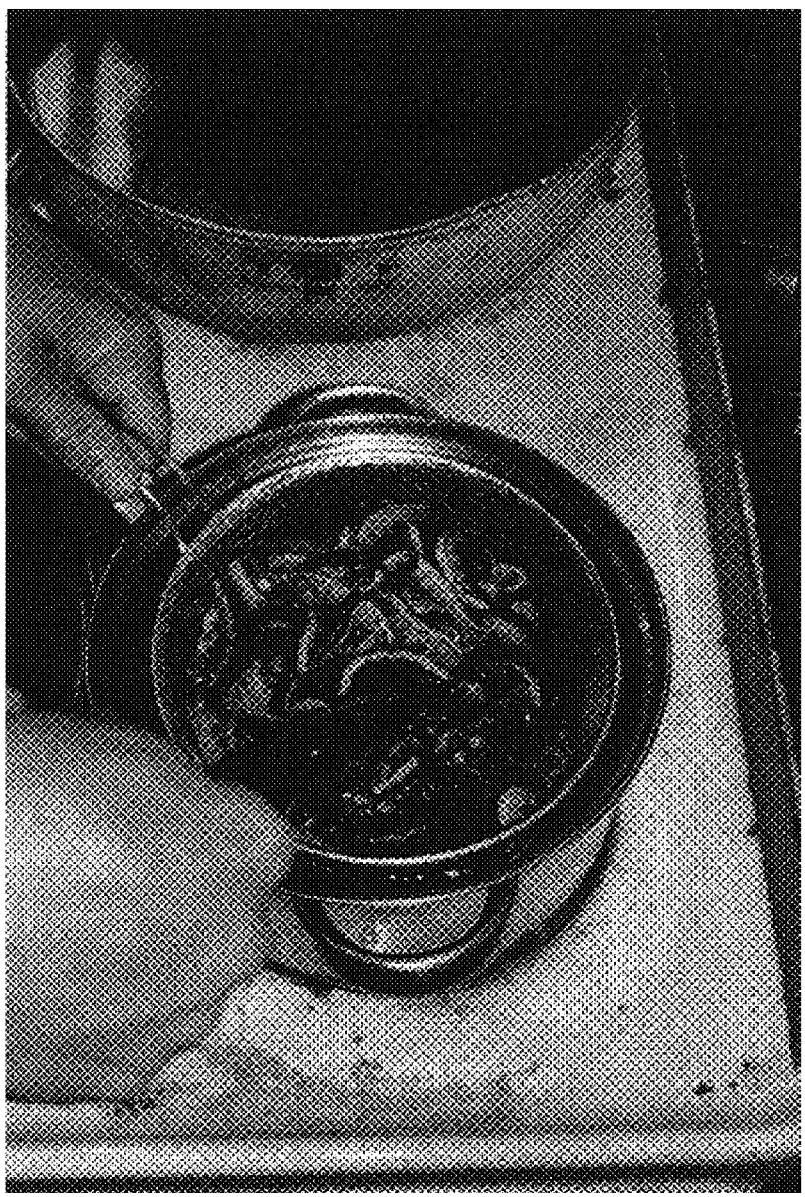
Figure 7:

Once the larvae are in the strainer, they are introduced to a bath of boiling water as shown in FIG. 6. The larvae die after approximately 2-3 seconds, and after about 5-10 seconds become "rigid" and stretch out in the water. Blanching cleanses and kills the balance of dirt and bacteria off of the larvae, brightens the color of the larvae, and toughens the skin of the caterpillars. It has been noted in our experiments that after about 20 seconds in the boiling water the outer "skin" of the Catalpa larvae becomes paperlike, brittle and tears easily.

This is unacceptable to most fishermen because they choose the Catalpa "worm" to fish with for the simple fact they are tough and stay on a hook for extended periods while fishing.

Figure 8:
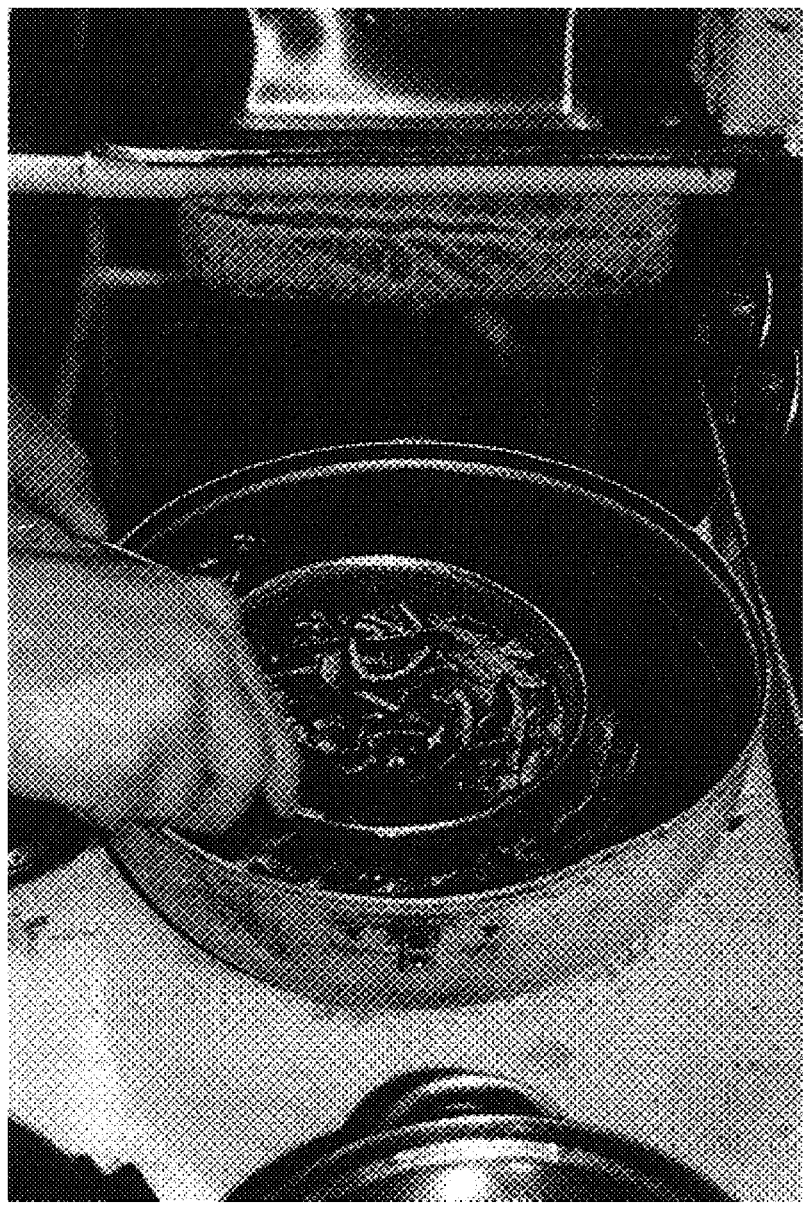

The larvae are then cooled, using an ice water bath to limit the "cooking" as shown in FIG. 8. Blanching the worms is not necessary to cook the worms, as it is to kill microorganisms, toughen the skin, and brighten the color of the caterpillars. Using the same strainer that was used to blanch the larvae, they are immersed in "cooling" water for 10-15 seconds.

Figure 9:
Figure 10:

After the larvae has been cooled in an ice bath, they are dried as shown in FIG. 9. This is done to limit the amount of water attached to the larvae once they are sealed, and to limit freezer burn. This step can be accomplished by drying the larvae with absorbent paper towels, placing them on a drying rack in an oven (set on 100 degrees for approximately 10 minutes). It is reasonably expected that the larvae can also be dried using any number of commercial food dryers available. The drying step usually takes 5 minutes.

Once the larvae are sufficiently dried, they are ready for packaging. Using sterile tongs or gloves, the larvae are placed in individual Vacuum Sealer Bags. The individual bags usually contain 10-12 caterpillars, and are sealed with a commercial heat sealer. Currently the blanched larvae are sealed in 3 millimeter Vacuum sealer bags. It has been noted that vacuum sealing the bags works well for this process, and that any plastic bag that limits the amount of oxygen transfer can be substituted. Heat sealing in a plastic bag is also satisfactory and can be less expensive. This packaging step takes approximately 10 minutes.

After the individual bags are sealed, they are placed inside a larger "freezer bag" (usually 10-15 individual bags). This is done to limit freezer burn, which would cause the larvae to loose their appeal to the end consumer, and to help identify the bags in a freezer. This step takes approximately 1-2 minutes. At this point in the process the double bagged larvae are frozen in a standard deep freezer (or commercial). To maintain the integrity of the bait, when they are shipped to dealers they are packaged in dry ice and kept frozen while in transit. Once the dealers receive the bait, it is thawed out for use. It has been noted that once the bait is thawed, it should be used within hours.

After the refrigeration step, the entire process typically takes 15-20 minutes, limiting the amount of time the larvae is exposed to agents (bacteria) in the surrounding air that may degrade the quality of the frozen bait.

It is recognized that preservatives can be added to this process at any step, and that the process can be automated with food processing equipment.

Figure 11:
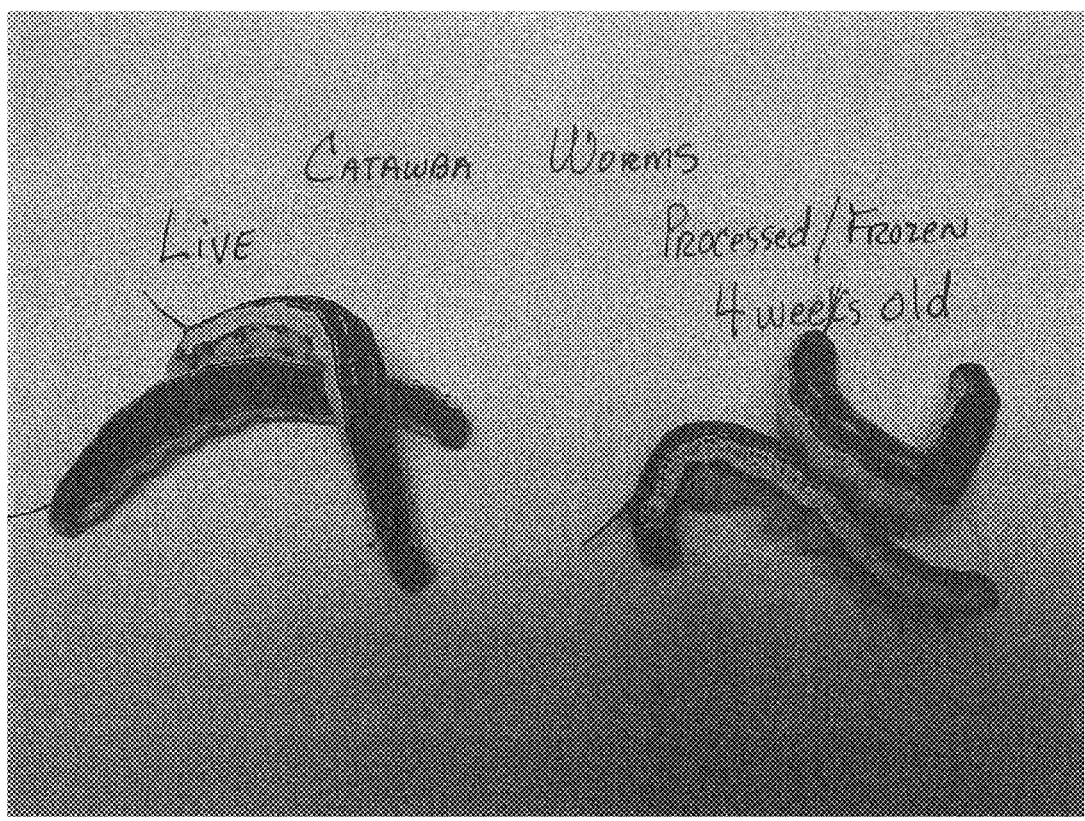
FIG. 11 is a color photograph comparing live *Ceratomia catalpae* larvae with *Ceratomia catalpae* larvae frozen in accordance with the process of this invention.
Figure 12:
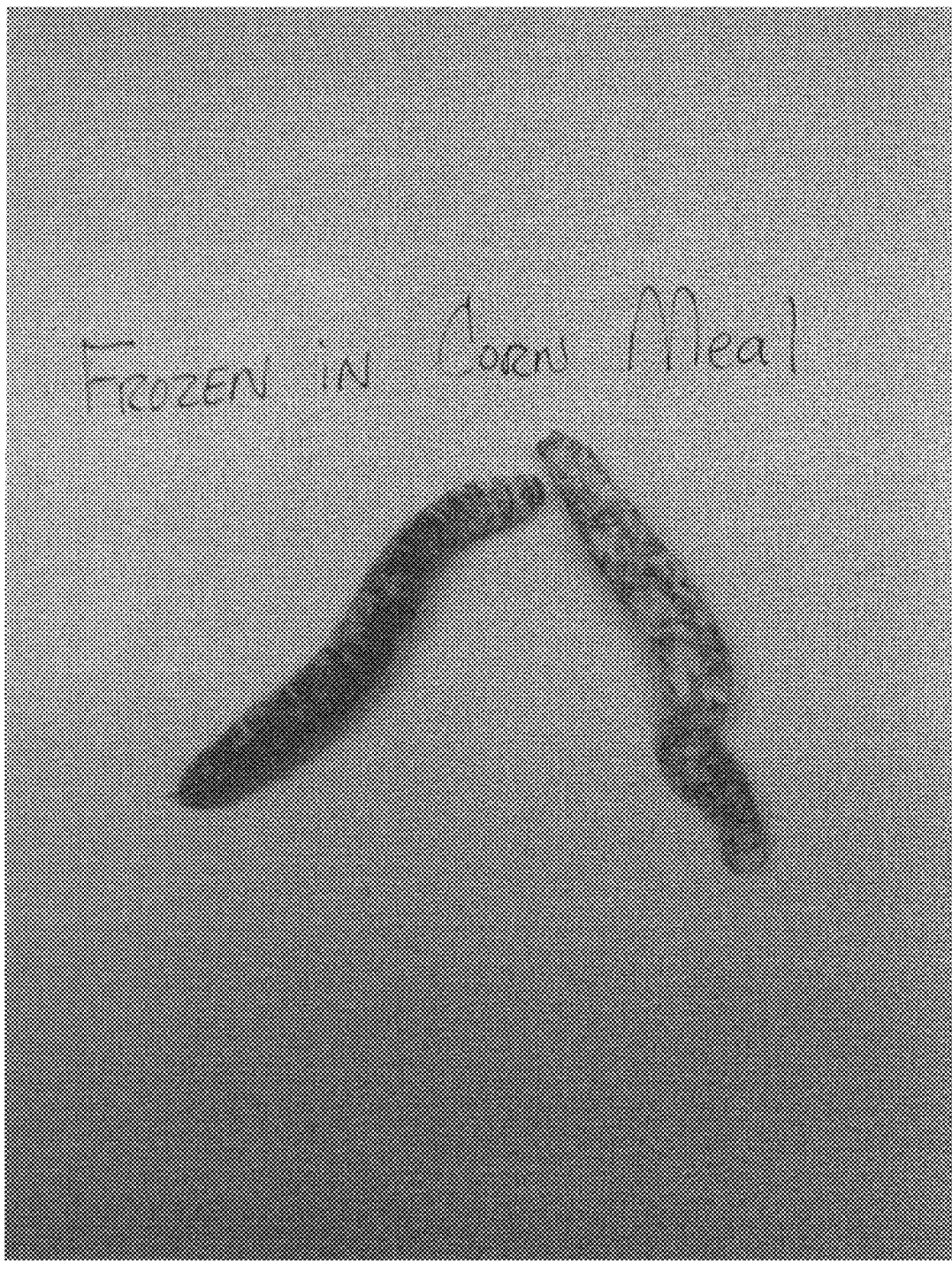
FIG. 12 is a color photograph of *Ceratomia catalpae* larvae frozen using a prior art method for purpose of comparison of the appearance of *Ceratomia catalpae* larvae frozen in accordance with this invention with the prior art process.
Figure 13:
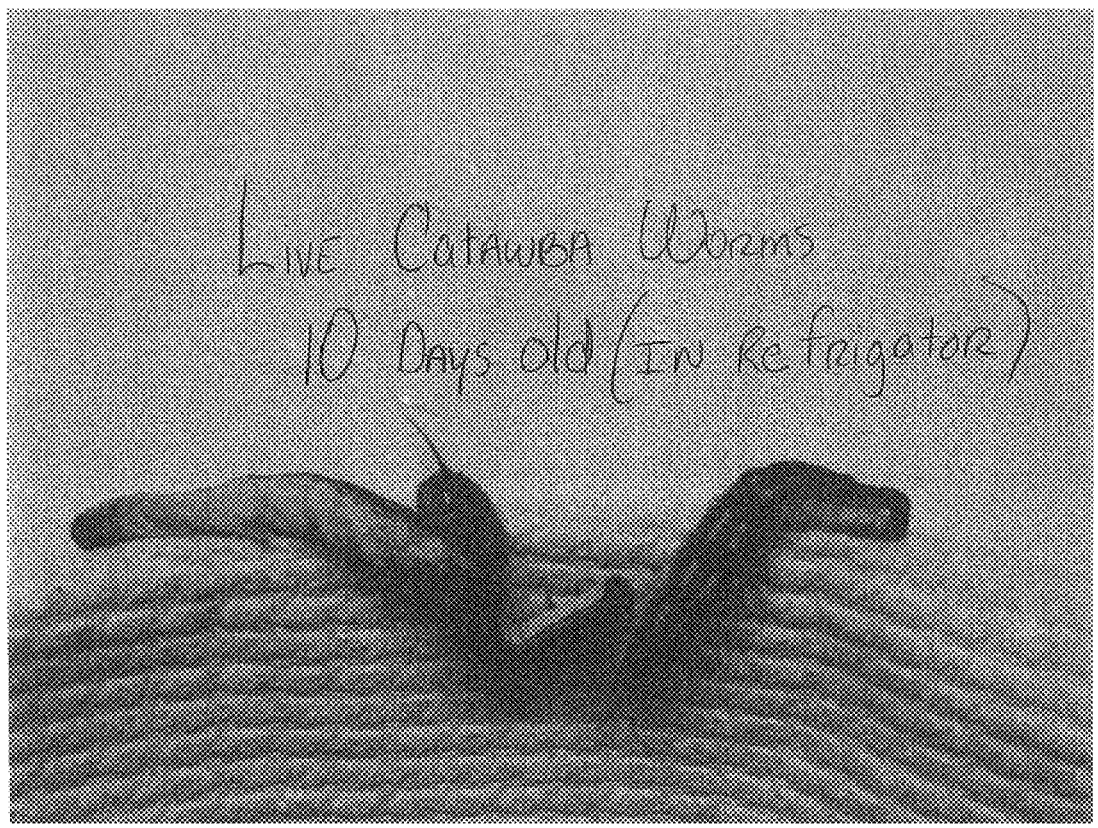
FIG. 13 is a color photograph of live *Ceratomia catalpae* larvae refrigerated for a period of ten days for the purpose of comparison with the *Ceratomia catalpae* larvae frozen in accordance with this invention.

It is important for the frozen, processed Catalpa worms to retain as many of the characteristics of the live Catalpa worms as possible in order to retain their appeal to both fish and fishermen. FIG. 11 is a color photograph comparing live Catalpa or Catawba worms with worms that have been processed and frozen and stored for four weeks. As apparent from these photographs the frozen Catalpa worms retain substantially the same coloration with yellow sides running adjacent a generally black back. As seen in the photograph, yellow patches in the predominately black back and black spots on the predominately yellow sides remain present in the frozen items. It has been determined that these frozen worms, when thawed, will retain much of the scent of the live Ceratomia catalpae larvae. The skin on the worms will also retain its toughness so that the thawed worms will remain on a fishhook. Comparison of Ceratomia catalpae frozen according to the method disclosed herein with Ceratomia catalpae larvae frozen by a prior art method, as shown in FIG. 12, shows that this new method results in a product having an appearance much closer to live Ceratomia catalpae larvae than previously attained. Inspection of FIG. 13 also shows that the Ceratomia catalpae larvae preserved by the instant method have a better appearance than live Ceratomia catalpae larvae that have been refrigerated for ten days, the maximum usable life of a refrigerated Catalpa or Catawba worms suitable for use as fishbait.

I claim:

1. A method of preserving harvested Ceratomia catalpae larvae for periods exceeding the larvae stage of Ceratomia catalpae for use as fishing bait, the method comprising the steps of:
   cleaning a batch of live Ceratomia catalpae larvae harvested from Catalpa trees to remove contaminants, including frass excreted by the Ceratomia catalpae larvae;
   introducing the batch of live Ceratomia catalpae larvae into heated water to blanch the batch of Ceratomia catalpae larvae for a period longer that the time required to kill the Ceratomia catalpae larvae;
   cooling the batch of Ceratomia catalpae larvae after blanching the batch of Ceratomia catalpae larvae to stop cooking due to blanching the batch of Ceratomia catalpae larvae;
   drying the batch of Ceratomia catalpae larvae; and
   freezing the Ceratomia catalpae larvae.

2. The method of claim 1 wherein the batch of Ceratomia catalpae larvae are introduced to water at a rolling boil to blanch the batch of Ceratomia catalpas larvae.

3. The method of claim 2 wherein the batch of Ceratomia catalpae larvae are removed from the heated water prior to tearing of outer skin on the Ceratomia catalpae larvae.

4. The method of claim 2 wherein the batch of Ceratomia catalpae larvae are blanched for a period of time to kill bacteria on the Ceratomia catalpae larvae, to brighten the color of Ceratomia catalpae larvae, and to toughen outer skin on the Ceratomia catalpae larvae.

5. The method of claim 2 wherein the batch of Ceratomia catalpae larvae are blanched for a period greater than 10 seconds and less than 20 seconds.

6. The method of claim 1 wherein the step of cooling the batch of Ceratomia catalpae larvae comprises the step of introducing the batch of Ceratomia catalpae larvae into an ice water bath.

7. The method of claim 6 wherein the batch of Ceratomia catalpae larvae are placed in the ice water bath less than 5 seconds after removal from the heated water used to blanch the batch of Ceratomia catalpae larvae.

8. The method of claim 1 wherein the step of drying the batch of Ceratomia catalpae larvae comprises the step of blotting the Ceratomia catalpae larvae.

9. The method of claim 1 wherein the step of drying the batch of Ceratomia catalpae larvae, comprises the step of heat drying at a temperature of approximately 100 degrees for a time of approximately 10 minutes.

10. The method of claim 1 wherein the Ceratomia catalpae larvae are packaged in containers to limit the presence of oxygen and are frozen in the containers.

11. The method of claim 10 wherein the containers comprise vacuum sealing plastic bags.

12. The method of claim 11 wherein the Ceratomia catalpae larvae are separated into batches smaller than when blanched when sealed in plastic bags and frozen, and wherein the multiple plastic bags layers are used to reduce freezer burn.

13. The method of claim 1, wherein a batch of harvested *Ceratomia catalpae* larvae are separated into smaller batches prior to the blanching step.

14. The method of claim 1 wherein harvested *Ceratomia catalpae* larvae are cooled prior to cleaning to limit physical activity during further processing.

15. The method of claim 1 wherein the harvested *Ceratomia catalpae* larvae are refrigerated at a temperature of 50-55 degrees for approximately two hours after harvesting and before cleaning to limit physical activity during further processing.

16. The method of claim 1 wherein the *ceratomia catalpae* larvae are preserved without addition of chemical preservatives.

17. A method of preserving *Ceratomia catalpae* larva without the use of chemical additives with an extended freezer life that is comprised of:
  a) harvesting the larvae from the group of trees comprising deciduous *Catalpa speciosa, Catalpa bignonioides, Catalpa ovata* (also known as *Catalpa kaempferi*) and *Catalpa bungei* trees, and refrigerating the harvested *Ceratomia catalpae* larva for approximately 2 hours to limit their physical activity;
  b) pre rinsing the said larvae in a bucket, so that the frass of the larvae falls to the bottom of the bucket;
  c) hand picking debris, including leaves or sticks out of the larvae that may have accumulated during harvesting;
  d) rinsing the larvae in a sink as to limit the amount of bacteria present on the worms, and clean off any frass still left on the caterpillars;
  e) introducing live larvae to a blanch bath of rolling/boiling water for approximately 10-15 seconds to reduce any microbiological activity present on the worms, brighten the color of the worms, and slightly toughen the outer skin of the larvae and to kill the larvae;
  f) placing the larvae processed in step (e) in a bath of cold ice water for 15-20 seconds to cool the larvae and to limit cooking;
  h) placing larvae on a drying rack to limit the amount of water left on the larvae when frozen, the drying process including at least one of the steps of blotting the larvae dry with paper towels, and drying the larvae in an oven;
  i) utilizing sterile instruments to place between ten and twelve dried larvae into a plastic bag to limit vapor and moisture transfer and sealing the bags with a heat sealer;
  j) placing the individual bags into larger bags to limit the amount of moisture loss, and to exclude oxygen while in the freezer;
  h) freezing the larvae.

18. A package of fresh water fishing bait comprising:
  a container substantially impervious to oxygen; and
  frozen *Ceratomia catalpae* larvae enclosed in the container, the frozen *Ceratomia catalpae* larvae exhibiting substantially the same coloring as live *Ceratomia catalpae* larvae and exhibiting the scent of live *Ceratomia catalpae* larvae, when thawed, and having skin exhibiting substantially the same toughness as the skin of live *Ceratomia catalpae* larvae;
  the frozen *Ceratomia catalpae* larvae exhibiting an absence of moisture not present in live *Ceratomia catalpae* larvae and an absence of chemical preservatives.

19. The package of claim 18 wherein the frozen *Ceratomia catalpae* larvae have a length of between three and four inches.

20. The package of claim 18 wherein the frozen *Ceratomia catalpae* larvae are packaged in a container comprising a vacuum bag.

\* \* \* \* \*